(12) United States Patent
Ong et al.

(10) Patent No.: US 12,210,633 B2
(45) Date of Patent: Jan. 28, 2025

(54) MEMORY CONTROLLER FOR IMPROVING DATA INTEGRITY AND PROVIDING DATA SECURITY AND A METHOD OF OPERATING THEREOF

(71) Applicant: SKYECHIP SDN BHD, Pulau Pinang (MY)

(72) Inventors: Yu Ying Ong, Pulau Pinang (MY); Muhamad Aidil Bin Jazmi, Pulau Pinang (MY); Soon Chieh Lim, Pulau Pinang (MY); Chee Hak Teh, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 633 days.

(21) Appl. No.: 17/179,369

(22) Filed: Feb. 18, 2021

(65) Prior Publication Data

US 2022/0253536 A1 Aug. 11, 2022

(30) Foreign Application Priority Data

Feb. 5, 2021 (MY) .............................. PI2021000662

(51) Int. Cl.
*G06F 21/60* (2013.01)
*G06F 7/58* (2006.01)
*G06F 11/10* (2006.01)
*G06F 13/16* (2006.01)
*G06F 21/64* (2013.01)

(52) U.S. Cl.
CPC ............ *G06F 21/602* (2013.01); *G06F 7/584* (2013.01); *G06F 11/1076* (2013.01); *G06F 13/1668* (2013.01); *G06F 21/64* (2013.01)

(58) Field of Classification Search
CPC .... G06F 21/602; G06F 7/584; G06F 11/1076; G06F 13/1668; G06F 21/64
See application file for complete search history.

(56) References Cited

U.S. PATENT DOCUMENTS

| 7,929,549 B1 * | 4/2011 | Talbot ................... H04L 9/0662 370/440 |
| 2010/0153699 A1 * | 6/2010 | Falconer ................. G06F 7/584 713/189 |

(Continued)

FOREIGN PATENT DOCUMENTS

| GB | 2 453 259 A | 4/2009 |

*Primary Examiner* — Alexander Lagor
*Assistant Examiner* — Zoha Piyadehghibi Tafaghodi
(74) *Attorney, Agent, or Firm* — Jayne Saydah

(57) ABSTRACT

A memory controller for improving data integrity and providing data security. The memory controller including a transmit data path to transmit write data to a memory device, the transmit data path comprising a scrambling component, wherein the scrambling component includes a scrambling logic and an exclusive OR logic, wherein the write data is divided into a first portion and a second portion, wherein input of the scrambling logic comprises the first portion of the write data and an address associated with the write data to generate a pseudo-random output, and wherein input of the exclusive OR logic comprises the second portion of the write data, the pseudo-random output and a fixed seed corresponding to the first portion of the write data to generate a scrambled data.

18 Claims, 6 Drawing Sheets

(56) References Cited

U.S. PATENT DOCUMENTS

| | | | |
|---|---|---|---|
| 2012/0144277 A1* | 6/2012 | Lee | H03M 13/09 |
| | | | 713/193 |
| 2014/0173238 A1* | 6/2014 | Ware | H04L 9/065 |
| | | | 711/163 |
| 2015/0012788 A1 | 1/2015 | Yen et al. | |
| 2015/0363263 A1* | 12/2015 | Hassner | H03M 13/1134 |
| | | | 714/757 |
| 2016/0328567 A1* | 11/2016 | Chang | G06F 21/85 |
| 2018/0074791 A1* | 3/2018 | Atsumi | G06F 7/584 |
| 2021/0326490 A1* | 10/2021 | Zalivaka | G06F 11/1068 |
| 2022/0139434 A1* | 5/2022 | Chang | G11C 16/26 |
| | | | 711/103 |

\* cited by examiner

|     | Byte 0 | Byte 1 | Byte 2 | Byte 3 | Byte 4 | Byte 5 | Byte 6 | Byte 7 | Byte 8 |
| --- | --- | --- | --- | --- | --- | --- | --- | --- | --- |
| BL0 | Data 0 | Data 1 | Data 2 | Data 3 | Data 4 | Data 5 | Data 6 | Data 7 | Data 7 |
| BL1 | Data 0 | Data 1 | Data 2 | Data 3 | Data 4 | Data 5 | Data 6 | Data 7 | Data 7 |
| BL2 | Data 0 | Data 1 | Data 2 | Data 3 | Data 4 | Data 5 | Data 6 | Data 7 | Data 7 |
| BL3 | Data 0 | Data 1 | Data 2 | Data 3 | Data 4 | Data 5 | Data 6 | Data 7 | Data 7 |
| BL4 | Data 0 | Data 1 | Data 2 | Data 3 | Data 4 | Data 5 | Data 6 | Data 6 | Data 7 |
| BL5 | Data 0 | Data 1 | Data 2 | Data 3 | Data 4 | Data 5 | Data 6 | Data 6 | Data 7 |
| BL6 | Data 0 | Data 1 | Data 2 | Data 3 | Data 4 | Data 5 | Data 6 | Data 6 | Data 7 |
| BL7 |        | ECC 0  | ECC 1  | ECC 2  | ECC 3  | ECC 4  | ECC 5  | ECC 6  | ECC 7  |

Figure 5

MEMORY CONTROLLER FOR IMPROVING DATA INTEGRITY AND PROVIDING DATA SECURITY AND A METHOD OF OPERATING THEREOF

CROSS-REFERENCE TO RELATED APPLICATIONS

This application claims priority to MY Patent Application No. PI2021000662 filed on Feb. 5, 2021, the entire contents of which are hereby incorporated by reference.

TECHNICAL FIELD

The present invention relates generally to a memory controller for improving data integrity and providing data security. More particularly, the present invention relates to a memory controller equipped with an error correcting code (ECC) implementation and a data scrambling/descrambling implementation. The present invention also relates to a method of operating a memory controller.

BACKGROUND ART

Memory devices, such as dynamic random access memories (DRAMs), store electronic data while memory controllers manage the flow of the electronic data to and from the memory devices. For writing data, some memory controllers scramble the electronic data and encode the scrambled data prior to storing the electronic data in the memory devices. Scrambling may be applied to improve signal-to-noise ratio on DRAM interface while encoding may be applied to perform error correction coding or data recovery.

Reading the stored data involves decoding the stored data and descrambling the decoded data prior to returning the original electronic data to a user. Numerous efforts have been made to provide improved memory controllers for reliable data transfer. Some of the efforts are discussed in the following references.

GB2453259A discloses an integrated circuit comprises a transmit data path, for transmitting data to one or more dynamic random access memory devices, which includes scrambling logic to generate, in parallel, N uncorrelated pseudo random outputs. The data to be transmitted, having M bits, and the pseudo random outputs are input to XOR logic so that M scrambled bits are output in parallel. Thus the scrambled output has a substantially white frequency spectrum. The scrambling logic uses a linear feedback shift register (LFSR) wherein the seed, which could itself be scrambled before use, is based on the memory address e.g. the column address. The polynomial used for the LFSR could be $X^{16}+X^{13}+X^{10}+X^9+X^8+X^4+1$. This scrambling method could be used to suppress power supply noise in, for example, double data rate (DDR) memory systems.

US2015012788A1 discloses a method for selecting the scrambling and descrambling data transmitted in a storage system containing ECC and scramble engines with a seed table is disclosed and the steps comprises: encoding a data sent from a HOST interface by an ECC encoding engine and transmitting the data to a LFSR scramble engine; scrambling the data by the LFSR scramble engine and transmitting to a storage device; creating a seed value and transmitting the seed value to a seed table by the LFSR scramble engine; receiving the seed value from the seed table and the scrambled data from the storage device by a LFSR descramble engine, and descrambling the scrambled data based on the seed value and transmitting to an ECC decoding engine; and decoding the descrambled data received from the LFSR descramble engine and then acquiring the original data sent from the HOST interface.

The aforementioned references and other solutions may strive to provide improved memory controllers. Nevertheless, they still have a number of limitations and shortcomings. For example, they only employ memory address as the scrambling/descrambling seed. The sole use of the memory address as the scrambling/descrambling seed will give rise to a predictable data pattern which may cause signal integrity issues due to resonance. Furthermore, none of the memory controllers in the aforementioned references teaches a modular ECC implementation which is capable of supporting any DRAM interface widths or protocols.

Accordingly, there remains a need to have a memory controller which overcomes the aforesaid problems and shortcomings.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a memory controller which can improve data integrity and provide data security.

It is also an objective of the present invention to provide a data scrambling/descrambling implementation which utilizes multiple seeds.

It is yet another objective of the present invention to provide a modular ECC implementation which is capable of supporting any DRAM interface widths or protocols.

It is also an objective of the present invention to provide a modular ECC implementation which can reduce routing congestion and ease timing closure across different data bytes with less power consumption.

It is also an objective of the present invention to provide a method of operating a memory controller for improving data integrity and providing data security.

Accordingly, these objectives may be achieved by following the teachings of the present invention. The present invention relates to a memory controller for improving data integrity and providing data security. The memory controller comprises a transmit data path to transmit write data to a memory device and the transmit data path comprises a scrambling component. The scrambling component includes a scrambling logic and an exclusive OR logic. The write data is divided into a first portion and a second portion. Input of the scrambling logic comprises the first portion of the write data and an address associated with the write data to generate a pseudo-random output. Input of the exclusive OR logic comprises the second portion of the write data, the pseudo-random output and a fixed seed corresponding to the first portion of the write data to generate a scrambled data. The transmit data path further comprises an error correcting code encoding component which comprises a plurality of encoding paths and each of the encoding paths comprises two error correcting code encoders.

The memory controller further comprises a receive data path to receive read data from the memory device and the receive data path comprises a descrambling component. The descrambling component includes a descrambling logic, a first exclusive OR logic and a second exclusive OR logic.

The read data is divided into a first portion and a second portion. Input of the first exclusive OR logic comprises the first portion of the read data and a fixed seed corresponding to the first portion of the read data to generate an output. Input of the descrambling logic comprises the output and an address associated with the read data to generate a pseudo-random output. Input of the second exclusive OR logic comprises the second portion of the read data, the pseudo-random output and the fixed seed corresponding to the first portion of the read data so as to generate a descrambled data. The receive data path further comprises an error correcting code decoding component which comprises a plurality of decoding paths and each of the decoding paths comprises two error correcting code decoders.

Furthermore, the present invention relates to a method of operating a memory controller for improving data integrity and providing data security. The method comprises the steps of transmitting write data to a transmit data path, dividing the write data into a first portion and a second portion, generating a pseudo-random output based on the first portion of the write data and an address associated with the write data through a scrambling logic, scrambling the second portion of the write data in response to the pseudo-random output and scrambling the first portion of the write data in response to a fixed seed corresponding to the first portion of the write data through an exclusive OR logic so as to generate a scrambled data, and encoding the scrambled data through an error correcting code encoding component before transmitting the scrambled data to the memory device.

The method further comprises the steps of receiving read data from the memory device in a receive data path, decoding the read data through an error correcting code decoding component, dividing the read data into a first portion and a second portion, generating an output based on the first portion of the read data and a fixed seed corresponding to the first portion of the read data through a first exclusive OR logic, generating a pseudo-random output based on the output and an address associated with the read data through a descrambling logic, and descrambling the second portion of the read data in response to the pseudo-random output and descrambling the first portion of the read data in response to the fixed seed corresponding to the first portion of the read data through a second exclusive OR logic so as to generate a descrambled data.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein:

FIG. 5 illustrates an ECC implementation in accordance with an embodiment of the present invention.

DETAILED DESCRIPTION OF THE INVENTION

Figure 1:
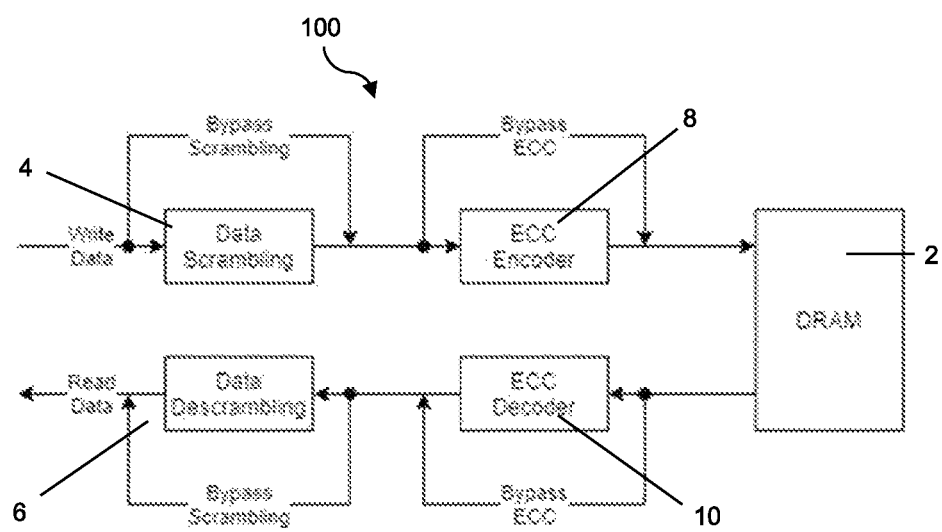
FIG. 1 illustrates a block diagram of a memory controller in accordance with an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more details.

FIG. 1 illustrates a block diagram of a memory controller (100) in accordance with an embodiment of the present invention. The memory controller (100) comprises a transmit data path and a receive data path. For writing data, the transmit data path is configured to transmit write data to a memory device (2) including, but not limited to, a DRAM. Preferably, the transmit data path comprises a scrambling component (4) and an ECC encoding component (8). The transmit data path can be arranged in such a way that the scrambling component (4) is followed by the ECC encoding component (8). Alternatively, the transmit data path can be arranged in such a way that the ECC encoding component (8) is followed by the scrambling component (4). For reading data, the receive data path is configured to receive read data from the DRAM. Preferably, the receive data path comprises a descrambling component (6) and an ECC decoding component (10). The receive data path can be arranged in a way that corresponds to the transmit data path, for a reverse process flow. For example, the ECC decoding component (10) can be followed by the descrambling component (6) in the receive data path when the scrambling component (4) is followed by the ECC encoding component (8) in the transmit data path. Alternatively, the descrambling component (6) can be followed by the ECC decoding component (10) in the receive data path when the ECC encoding component (8) is followed by the scrambling component (4) in the transmit data path.

In accordance with an embodiment of the present invention, a bypass path is equipped in parallel with each of the scrambling component (4), the descrambling component (6), the ECC encoding component (8) and the ECC decoding component (10) to provide an alternative path for data to flow. The bypass path can be used to bypass the ECC encoding component (8) and the ECC decoding component (10) when they are not in use. Further, the bypass path can be used for test and debug purposes. For example, in the event of testing the scrambling component (4) and/or the ECC encoding component (8), the bypass path can be used to bypass the descrambling component (6) and/or the ECC decoding component (10) so as to receive a raw value to be checked against an expected value.

Figure 2:
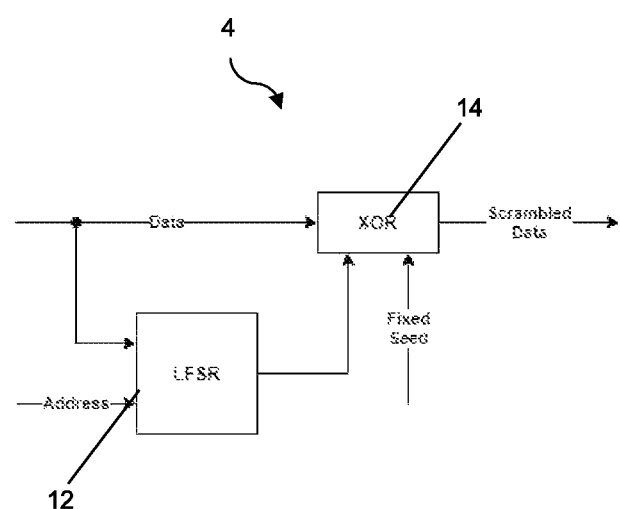
FIG. 2 illustrates a block diagram of a scrambling component in accordance with an embodiment of the present invention.

FIG. 2 illustrates a block diagram of a scrambling component (4) in accordance with an embodiment of the present invention. The scrambling component (4) comprises a scrambling logic (12) and an exclusive OR (XOR) logic (14). Preferably, the write data is divided into a first portion and a second portion. Input of the scrambling logic (12) comprises the first portion of the write data and an address associated with the write data to generate a pseudo-random output. Further, input of the XOR logic (14) comprises the second portion of the write data, the pseudo-random output and a fixed seed corresponding to the first portion of the write data to generate a scrambled data. The scrambling logic (12) is initialized or seeded with the first portion of the write data in order to ensure that the scrambled data is less susceptible to contents that generate patterns that may cause signal resonance even if the address and the contents are similar since the scrambled data is no longer repeatable after involving the first portion of the write data. The use of the first portion of the write data in addition to the address as scrambling seed provides a certain degree of data security since the scrambling seed is no longer predictable based on the address alone. An XOR operation is performed between the pseudo-random output and the fixed seed corresponding to the first portion of the write data so that the scrambled data can be descrambled deterministically in a later stage. The scrambled data can be subsequently encoded and/or stored in the DRAM.

In accordance with an embodiment of the present invention, the scrambling logic (12) comprises a linear feedback shift register (LFSR).

In one embodiment, the LFSR provides an output of 16 bits per cycle. Alternatively, the LFSR may output a different number of bits including, but not limited to, 8, 32, and 64 per cycle according to requirements. In the embodiment, the LFSR implements a 16-bit polynomial: $X^{16}+X^{15}+X^{13}+X^4+1$. It is readily understood that the LFSR may implement different polynomials according to requirements. In the embodiment, the address that is used to seed the LFSR includes the following bits: R[7], C[6], C[5], R[3], C[2], C[8], C[7], C[3], R[1], R[0], BG[1], BA[1], BA[0], BG[0], C[4], C[1]. "R" refers to row. "C" refers to column. "BG" refers to bank group while "BA" refers to bank address. Further, in the embodiment, the write data that is used to seed the LFSR includes the following bits: CONSTANT7, D[18], CONSTANT6, D[54], CONSTANT 5, D[0], CONSTANT4, D[36], CONSTANT3, D[9], CONSTANT2, D[45], CONSTANT1, D[63], CONSTANT0, D[27], where CONSTANT0-7 can be 1'b0 or 1'b1. The fixed seed corresponding to the write data can be a string of binary numbers. Particularly, the fixed seed corresponding to the write data is same as the fixed seed corresponding to the read data.

In accordance with an embodiment of the present invention, the descrambling component (6) comprises a descrambling logic (16), a first XOR logic (14) and a second XOR logic (14). Preferably, the read data is divided into a first portion and a second portion. Input of the first XOR logic (14) comprises the first portion of the read data and a fixed seed corresponding to the first portion of the read data to generate an output. Input of the descrambling logic (16) comprises the output and an address associated with the read data to generate a pseudo-random output. Further, input of the second XOR logic (14) comprises the second portion of the read data, the pseudo-random output and the fixed seed corresponding to the first portion of the read data so as to generate a descrambled data. The descrambled data can be subsequently decoded and/or returned to a user.

In accordance with an embodiment of the present invention, the descrambling logic (16) comprises a LFSR.

Figure 3:
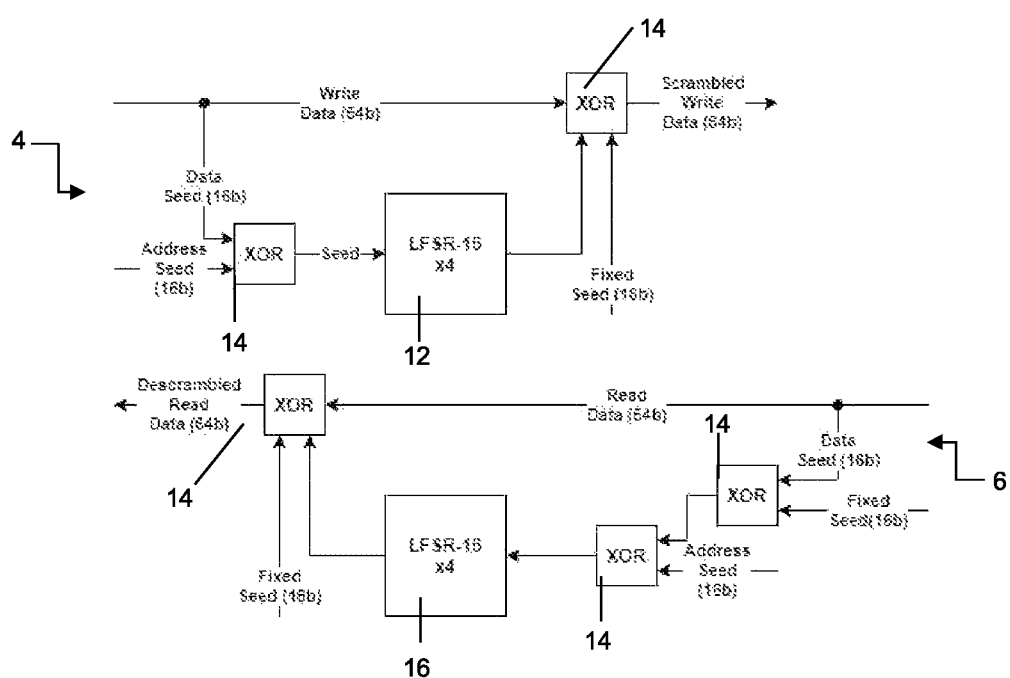
FIG. 3 illustrates a block diagram of a data scrambling and data descrambling implementation in accordance with an embodiment of the present invention.

FIG. 3 illustrates a block diagram of a data scrambling and data descrambling implementation in accordance with an embodiment of the present invention. In the implementation, the transmit and receive data paths are 64-bit wide respectively. 4 copies of LFSR-16 in each of the transmit and receive data paths can be used to generate the pseudo-random output to scramble and descramble data except for data that is used as data seed. The data that is used as the data seed is scrambled with a corresponding fixed seed so that the read data can be descrambled predictably. An XOR operation is performed between the read data and the fixed seed before the data descrambling implementation taking place in the receive data path. An additional XOR logic (14) can be used to provide seed to the LFSR-16 based on address seed and write data seed/XORed read data seed. Each copy of the LFSR-16 will get different BL[1:0] values in order to generate different pseudo-random output. For example, BL[1:0]=2'b00 is for LFSR-16 copy number 1, BL[1:0]=2'b01 is for LFSR-16 copy number 2, BL[1:0]=2'b10 is for LFSR-16 copy number 3, and BL[1:0]=2'b11 is for LFSR-16 copy number 4.

Figure 4:
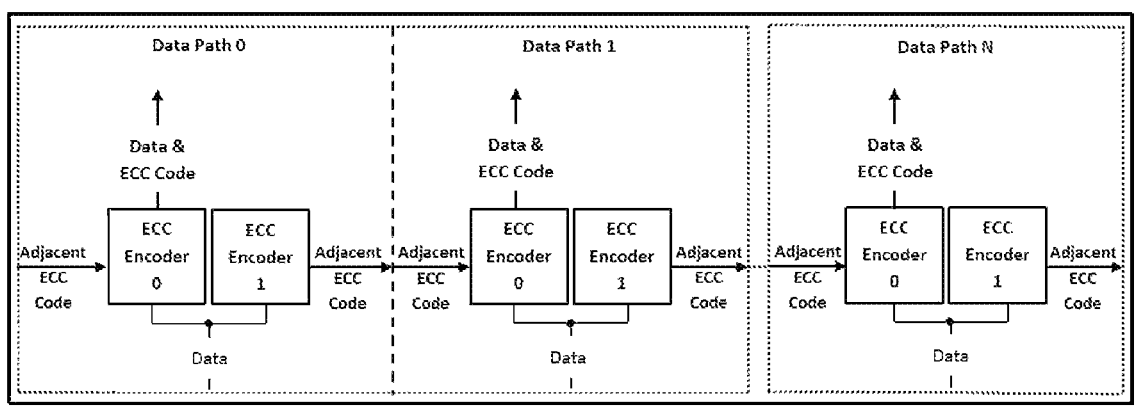
FIG. 4 illustrates a block diagram of an ECC encoding component in accordance with an embodiment of the present invention.

FIG. 4 illustrates a block diagram of an ECC encoding component (8) in accordance with an embodiment of the present invention. The ECC component (8) comprises a plurality of encoding paths and each of the encoding paths comprises two ECC encoders configured to transfer an error correcting code to one of the adjacent encoding paths and to distribute the error correcting code across different data paths for a wide data path implementation. Referring to FIG. 4, in data path 0, encoder 0 performs encoding operation using data and ECC code from adjacent data path on the left, and outputs the encoded data and ECC code. Encoder 1 performs encoding and transfer the ECC code to adjacent data path on the right which is data path 1. In data path 1, encoder 0 performs encoding operation using data and ECC code from adjacent data path on the left which is data path 0, and outputs the encoded data and ECC code. Encoder 1 performs encoding and transfer the ECC code to adjacent data path on the right which can be data path 2 for subsequent encoding operation. The total number of the data paths can be configured to support a DRAM interface width or protocol. For example, when each data path supports 8-bit data transfer, a total of 9 data paths can be configured to support a DRAM ECC dual in-line memory module (DIMM) interface of 72-bit as shown in FIG. 5. In FIG. 5, each of Byte 0-8 represents DRAM DQ byte. For example, Byte 0 refers to DQ [7:0]. Further, each of BL0-7 represents DRAM burst length. For example, BL0 refers to burst length 0. Therefore, BL0 row in Byte 0 column represents burst length 0 data in DQ [7:0]. Further, ECC0 refers to the associated ECC information for Data 0.

Figure 6:
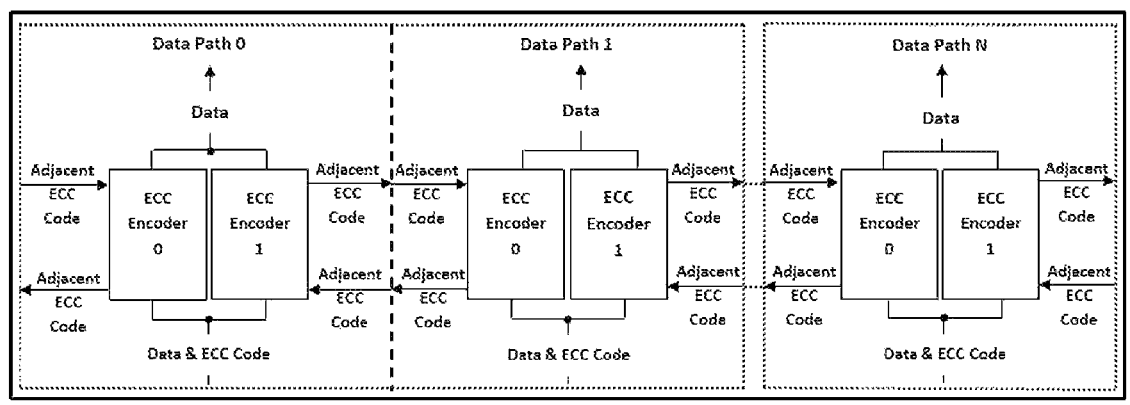
FIG. 6 illustrates a block diagram of an ECC decoding component in accordance with an embodiment of the present invention

FIG. 6 illustrates a block diagram of an ECC decoding component (10) in accordance with an embodiment of the present invention. The ECC decoding component (10) comprises a plurality of decoding paths and each of the decoding paths comprises two ECC decoders configured to transfer an error correcting code to each of the adjacent decoding paths and to distribute the error correcting code across different data paths. Referring to FIG. 6, in data path 0, decoder 0 and decoder 1 in parallel perform decoding operation using data from the current path and ECC codes from adjacent data paths on the left and right. In data path 1, decoder 0 and decoder 1 perform decoding operation using data from the current path and ECC codes from adjacent data paths on the left and right which can be data path 0 and data path 2. Similar to the ECC encoding component (8), the total number of the data paths of the ECC decoding component (10) can be configured to support a DRAM interface width or protocol.

The present invention also relates to a method of operating a memory controller (100) for improving data integrity and providing data security. The method comprises the steps of transmitting write data to a transmit data path, dividing the write data into a first portion and a second portion, generating a pseudo-random output based on the first portion of the write data and an address associated with the write data through a scrambling logic (12), scrambling the second portion of the write data in response to the pseudo-random output and scrambling the first portion of the write data in response to a fixed seed corresponding to the first portion of the write data through an XOR logic (14) so as to generate a scrambled data, and transmitting the scrambled data to a memory device (2).

In accordance with a first embodiment of the method of operating the memory controller (100), the method further comprises the steps of encoding the scrambled data through an ECC encoding component (8) before transmitting the scrambled data to the memory device (2).

In accordance with the first embodiment of the method of operating the memory controller (100), the method further comprises the steps of receiving read data from the memory device (2) in a receive data path, decoding the read data through an ECC decoding component (10), dividing the read data into a first portion and a second portion, generating an output based on the first portion of the read data and a fixed seed corresponding to the first portion of the read data through a first XOR logic (14), generating a pseudo-random output based on the output and an address associated with the read data through a descrambling logic (16), and descrambling the second portion of the read data in response to the pseudo-random output and descrambling the first portion of the read data in response to the fixed seed corresponding to the first portion of the read data through a second XOR logic (14) so as to generate a descrambled data.

In accordance with a second embodiment of the method of operating the memory controller (100), the write data can be encoded through the ECC encoding component (8) before the write data is divided into the first portion and the second portion.

In accordance with the second embodiment of the method of operating the memory controller (100), the method further comprises the steps of receiving read data from the memory device (2) in a receive data path, dividing the read data into a first portion and a second portion, generating an output based on the first portion of the read data and a fixed seed corresponding to the first portion of the read data through a first XOR logic (14), generating a pseudo-random output based on the output and an address associated with the read data through a descrambling logic (16), descrambling the second portion of the read data in response to the pseudo-random output and descrambling the first portion of the read data in response to the fixed seed corresponding to the first portion of the read data through a second XOR logic (14) so as to generate a descrambled data, and decoding the descrambled data through the ECC decoding component (10).

The above-mentioned memory controller (100) overcomes the problems and shortcomings of the existing solutions and additionally offers numerous advantages over them. For example, the data scrambling/descrambling implementation in the present invention utilizes multiple different components such as address, data and a fixed seed corresponding to the data to improve data integrity and provide data security. In addition, the ECC implementation in the present invention is capable of supporting any DRAM interface widths or protocols through configuring the data path number of the ECC encoding component (8) and the ECC decoding component (10). Also, in comparison to the existing solutions employing only a central encoder/decoder which may cause routing congestion, the modular ECC implementation in the present invention is capable of reducing routing resources across wide interface and thereby easing timing closure across different data bytes with less power consumption as a result of reduced back and forth buffering of each data path.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A memory controller for improving data integrity and providing data security, the memory controller comprising:
   a transmit data path configured to transmit, via the transmit data path, write data to a memory device,
   a scrambling component provided on the transmit data path,
   a receive data path configured to receive, via the receive data path, read data from the memory device, and
   a descrambling component provided on the receive data path;
   wherein the scrambling component includes a scrambling logic and a first exclusive OR logic;
   wherein the write data is divided into a first write data portion and a second write data portion;
   wherein the scrambling logic is seeded with the first write data portion and an address associated with the write data to generate a first pseudo-random output, and
   wherein input of the first exclusive OR logic comprises the second write data portion, the first pseudo-random output and a fixed seed corresponding to the first write data portion to generate scrambled data;
   wherein the descrambling component includes a descrambling logic, a second exclusive OR logic and a third exclusive OR logic;
   wherein the read data is divided into a first read data portion and a second read data portion;
   wherein input of the second exclusive OR logic comprises the first read data portion and a fixed seed corresponding to the first read data portion to generate an output;
   wherein input of the descrambling logic comprises the output and an address associated with the read data to generate a second pseudo-random output; and
   wherein input of the third exclusive OR logic comprises the second read data portion, the second pseudo-random output and the fixed seed corresponding to the first read data portion so as to generate a descrambled data;
   wherein the transmit data path further comprises an error correcting code encoding component,
   wherein the error correcting code encoding component comprises a plurality of encoding paths and each of the encoding paths comprises two error correcting code encoders configured to transfer an error correcting code to one of adjacent encoding paths and to distribute the error correcting code across different data paths.

2. The memory controller as claimed in claim 1, wherein the scrambling logic comprises a linear feedback shift register.

3. The memory controller as claimed in claim 1, wherein the descrambling logic comprises a linear feedback shift register.

4. The memory controller as claimed in claim 1, wherein the receive data path further comprises an error correcting code decoding component.

5. The memory controller as claimed in claim 4, wherein the error correcting code decoding component comprises a plurality of decoding paths and each of the decoding paths comprises two error correcting code decoders configured to transfer an error correcting code to each of adjacent decoding paths.

6. A method of operating a memory controller for improving data integrity and providing data security, the method comprising:
   transmitting write data to a transmit data path;
   dividing the write data into a first write data portion and a second write data portion;
   generating a first pseudo-random output through a scrambling logic, wherein the scrambling logic is seeded with the first write data portion and an address associated with the write data;
   scrambling the second write data portion in response to the first pseudo-random output and scrambling the first write data portion based on a fixed seed corresponding to the first write data portion through a first exclusive OR logic so as to generate scrambled data;
   transmitting the scrambled data to a memory device;
   receiving read data from a receive data path;
   dividing the read data into a first read data portion and a second read data portion;
   generating an output based on the first read data portion and a fixed seed corresponding to the first read data portion through a second exclusive OR logic;
   generating, through a descrambling logic, a second pseudo-random output based on the output and an address associated with the read data; and
   descrambling the second read data portion in response to the second pseudo-random output and descrambling the first read data portion in response to the fixed seed corresponding to the first read data portion through a third exclusive OR logic so as to generate descrambled data;
   wherein the transmit data path further comprises an error correcting code encoding component,
   wherein the error correcting code encoding component comprises a plurality of encoding paths and each of the encoding paths comprises two error correcting code encoders configured to transfer an error correcting code to one of adjacent encoding paths and to distribute the error correcting code across different data paths.

7. The method as claimed in claim 6, further comprising:
   encoding the scrambled data through an error correcting code encoding component before transmitting the scrambled data to the memory device.

8. The method as claimed in claim 7, further comprising:
   decoding the read data through an error correcting code decoding component-before dividing the read data into the first read data portion and the second read data portion.

9. The method as claimed in claim 6, further comprising:
   encoding the write data through an error correcting code encoding component before dividing the write data into the first write data portion and the second write data portion.

10. The method as claimed in claim 9, further comprising:
    decoding the descrambled data through an error correcting code decoding component.

11. The memory controller as claimed in claim 1, wherein the transmit data path and the receive data path are each 64-bit wide and the linear feedback shift register provides output of 16 bits per cycle.

12. The memory controller as claimed in claim 1, wherein
    at least two copies of a linear feedback shift register in each of the transmit data path and the receive data path are used to generate the first and second pseudo-random outputs to respectively scramble and descramble data, and
    each copy of the linear feedback shift register receives different values in order to generate different pseudo-random output.

13. The memory controller as claimed in claim 1, wherein the scrambling component is further configured to scramble data that is used as a data seed with a corresponding fixed seed so that the read data is descrambled predictably.

14. The memory controller as claimed in claim 1, wherein an XOR operation is performed between the read data and the fixed seed before the descrambling takes place in the receive data path.

15. The method as claimed in claim 6, wherein
the scrambling logic comprises a linear feedback shift register,
the transmit data path and the receive data path are each 64-bit wide, and
the linear feedback shift register provides output of 16 bits per cycle.

16. The method as claimed in claim 6, further comprising:
using at least two copies of a linear feedback shift register in each of the transmit data path and the receive data path to generate the first and second pseudo-random outputs to respectively scramble and descramble data, and
receiving, by each copy of the linear feedback shift register, different values in order to generate different pseudo-random output.

17. The method as claimed in claim 6, further comprising:
scrambling data that is used as a data seed with a corresponding fixed seed so that the read data is descrambled predictably.

18. The method as claimed in claim 6, further comprising:
performing an XOR operation between the read data and the fixed seed before the data descrambling takes place in the receive data path.

* * * * *